United States Patent
Chen

(10) Patent No.: US 6,953,641 B2
(45) Date of Patent: Oct. 11, 2005

(54) BATTERY GRID

(75) Inventor: Yu-Lin Chen, Menomonee Falls, WI (US)

(73) Assignee: Johnson Controls Technology Company, Holland, MI (US)

(*) Notice: Subject to any disclaimer, the term of this patent is extended or adjusted under 35 U.S.C. 154(b) by 403 days.

(21) Appl. No.: 09/755,337

(22) Filed: Jan. 5, 2001

(65) Prior Publication Data

US 2002/0090554 A1 Jul. 11, 2002

(51) Int. Cl.[7] .............................. H01M 4/74; H01M 4/76

(52) U.S. Cl. .............................. 429/242; 429/245; 29/2

(58) Field of Search ................................ 429/245, 242; 29/2

(56) References Cited

U.S. PATENT DOCUMENTS

| | | | |
|---|---|---|---|
| 1,500,219 A | 7/1924 | Benner | |
| 2,193,782 A | 3/1940 | Smith | 136/64 |
| 2,282,760 A | 5/1942 | Hauel | 136/64 |
| 3,398,024 A | 8/1968 | Barnes | |
| 3,556,853 A | * 1/1971 | Cannone | 429/241 |
| 3,556,854 A | 1/1971 | Wheadon et al. | |
| 3,909,293 A | 9/1975 | Hammond et al. | |
| 3,926,247 A | 12/1975 | Geiger et al. | 164/263 |
| 3,929,513 A | * 12/1975 | Mao | 429/226 |
| 3,933,524 A | 1/1976 | Hughel et al. | 136/64 |
| 3,947,936 A | 4/1976 | Wheadon | |
| 3,959,016 A | 5/1976 | Tsuda | 136/67 |
| 4,016,633 A | 4/1977 | Smith et al. | |
| 4,097,625 A | 6/1978 | Lunn et al. | 427/360 |
| 4,107,407 A | 8/1978 | Koch | 429/226 |

(Continued)

FOREIGN PATENT DOCUMENTS

| | | |
|---|---|---|
| EP | 0 348 702 A | 1/1980 |
| EP | 0348702 A1 | 6/1989 |
| EP | 0795917 A2 | 9/1997 |
| EP | 0 795 917 A2 | 9/1997 |
| JP | 55130076 | 10/1980 |
| JP | 55144659 | 11/1980 |
| JP | 56032678 | 4/1981 |
| JP | 56107474 | 8/1981 |
| JP | 56138872 | 10/1981 |
| JP | 56165279 | 12/1981 |
| JP | 56167271 | 12/1981 |
| JP | 57205969 | 12/1982 |
| JP | 58032367 | 2/1983 |
| JP | 58066266 | 4/1983 |

(Continued)

OTHER PUBLICATIONS

English Abstract for Japanese Patent Publication No. 11–054115, Published Feb. 26, 1999.

(Continued)

Primary Examiner—Carol Chaney
(74) Attorney, Agent, or Firm—Foley & Lardner LLP

(57) ABSTRACT

A method of forming battery grids or plates that includes the step of applying a lead alloy coating to a continuous strip of interconnected battery grids formed from a lead alloy grid material is disclosed. The battery grids may be formed by a continuous battery grid making process such as strip expansion, strip punching, or continuous grid casting. In one version of the method, the grid wires of a continuous strip of battery grids produced by a punching process are immersed in a melt of the lead alloy coating. In another version of the method, the grid wires of a continuous strip of battery grids produced by a punching process are deformed such that the grid wires have a cross-section other than the rectangular cross-section produced by the punching process and the strip of interconnected grids is immersed in a melt of the lead alloy coating. The method increases the cycle life of a battery.

38 Claims, 7 Drawing Sheets

U.S. PATENT DOCUMENTS

| | | | |
|---|---|---|---|
| 4,140,840 A | 2/1979 | Ruben | 429/190 |
| 4,151,331 A | 4/1979 | Hug et al. | |
| 4,196,757 A | 4/1980 | Hug et al. | |
| 4,221,852 A | 9/1980 | Qureshi | |
| 4,291,443 A | 9/1981 | Laurie et al. | 29/6.1 |
| 4,297,866 A | 11/1981 | Sakauye et al. | 72/186 |
| 4,303,747 A | 12/1981 | Bender | |
| 4,305,187 A | 12/1981 | Iwamura et al. | |
| 4,315,356 A | 2/1982 | Laurie et al. | 29/6.1 |
| 4,349,067 A | 9/1982 | Wirtz et al. | |
| 4,386,987 A | 6/1983 | Covitch et al. | 156/155 |
| 4,460,666 A | 7/1984 | Dinkler et al. | 429/236 |
| 4,498,519 A | 2/1985 | Watanabe et al. | 164/417 |
| 4,606,383 A | 8/1986 | Yanik | 141/32 |
| 4,761,356 A | 8/1988 | Kobayashi et al. | 429/242 |
| 4,782,585 A | 11/1988 | Kobayashi et al. | 29/623.5 |
| 4,805,277 A | 2/1989 | Yasuda et al. | 29/2 |
| 4,865,928 A | 9/1989 | Richter | 429/120 |
| 4,865,933 A | 9/1989 | Blanyer et al. | 429/241 |
| 4,906,540 A | 3/1990 | Hoshihara et al. | 429/242 |
| 4,939,051 A | 7/1990 | Yasuda et al. | 429/245 |
| 4,982,482 A | 1/1991 | Wheadon et al. | |
| 5,024,908 A | 6/1991 | Terada et al. | 429/245 |
| 5,344,727 A | 9/1994 | Meadows et al. | 429/210 |
| 5,462,109 A | 10/1995 | Vincze et al. | 164/479 |
| 5,543,250 A | 8/1996 | Yanagihara et al. | 429/241 |
| 5,582,936 A | 12/1996 | Mrotek et al. | |
| 5,611,128 A | 3/1997 | Wirtz | 29/2 |
| 5,643,696 A | 7/1997 | Rowlette | 429/210 |
| 5,851,695 A | 12/1998 | Misra et al. | |
| 5,858,575 A * | 1/1999 | Chen | 429/245 |
| 5,958,625 A | 9/1999 | Rao | |
| 5,989,749 A | 11/1999 | Kao et al. | |
| 6,037,081 A | 3/2000 | Kashio et al. | 429/242 |
| 6,057,059 A | 5/2000 | Kwok et al. | 429/235 |
| 6,117,594 A | 9/2000 | Taylor et al. | 429/245 |
| 6,274,274 B1 | 8/2001 | Schaeffer et al. | |

FOREIGN PATENT DOCUMENTS

| | | |
|---|---|---|
| JP | 5807572 | 5/1983 |
| JP | 58075772 | 5/1983 |
| JP | 59134563 | 8/1984 |
| JP | 60037663 | 2/1985 |
| JP | 60039766 | 3/1985 |
| JP | 60143570 | 7/1985 |
| JP | 60167267 | 8/1985 |
| JP | 60167268 | 8/1985 |
| JP | 60198055 | 10/1985 |
| JP | 61124052 | 6/1986 |
| JP | 63213264 | 9/1988 |
| JP | 1030168 | 2/1989 |
| JP | 2297864 | 12/1990 |
| JP | 3030260 | 2/1991 |
| JP | 5036416 | 2/1993 |
| JP | 5275081 | 10/1993 |
| JP | 8083617 | 3/1996 |
| JP | 8287905 | 11/1996 |
| WO | WO 99/27595 | 6/1999 |
| WO | WO 02/054513 A2 | 7/2002 |

OTHER PUBLICATIONS

English Abstract for Japanese Patent Publication No. 10-284085, Published Oct. 23, 1998.

International Search Report (Form PCT/ISA/210) for PCT/US02/00390 for Johnson Controls Technology Company, dated Aug. 7, 2002 (mailed Aug. 19, 2002), Authorized Officer: H. Engl, 3 pages.

Patent Abstract for JP 3245462.

Patent Abstract for AU 275685.

PCT International Search Report for PCT/US00/18114 dated Oct. 9, 2000.

Office Action dated May 1, 2003 for U.S. Appl. No. 09/898, 660.

Office Action dated Mar. 24, 2003 for U.S. Appl. No. 09/898,660.

Copy of U.S. Appl. No. 09/898,660, titled "Modification of the Shape/Surface Finish of Battery Grid Wires to Improve Paste Adhesion," by Schaeffer et al., filed on Jul. 2, 2001.

Ishikawa et al., "A punched grid production process for automotive batteries" from Pb 80, 7th International Conference, (1980).

* cited by examiner

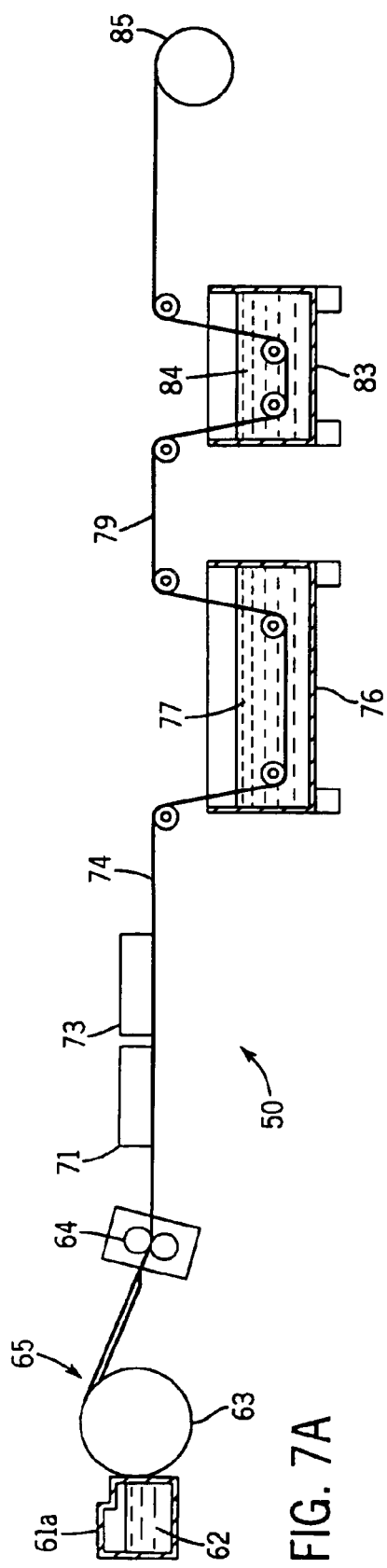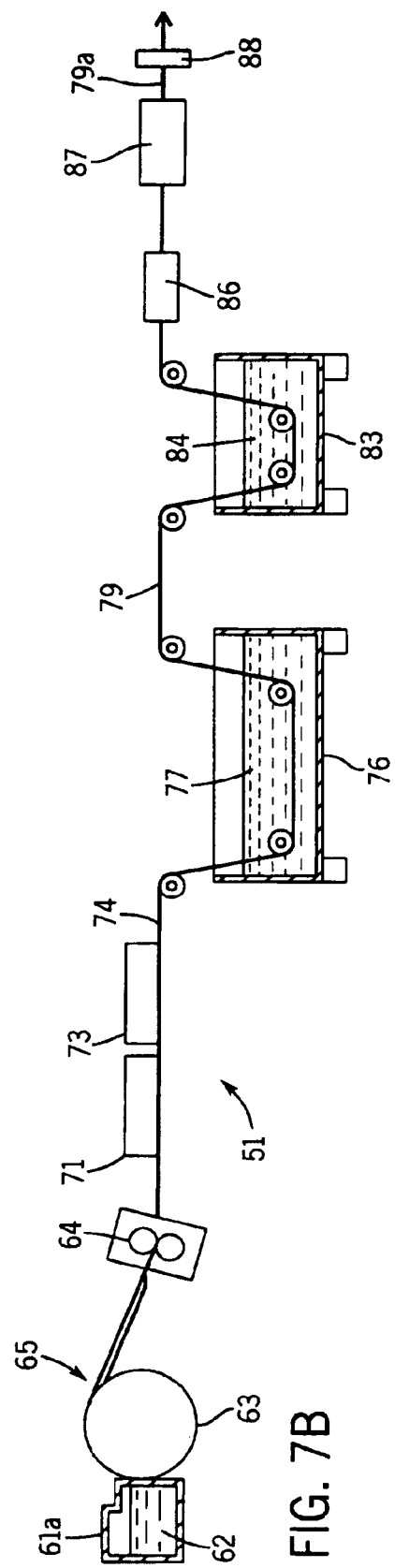

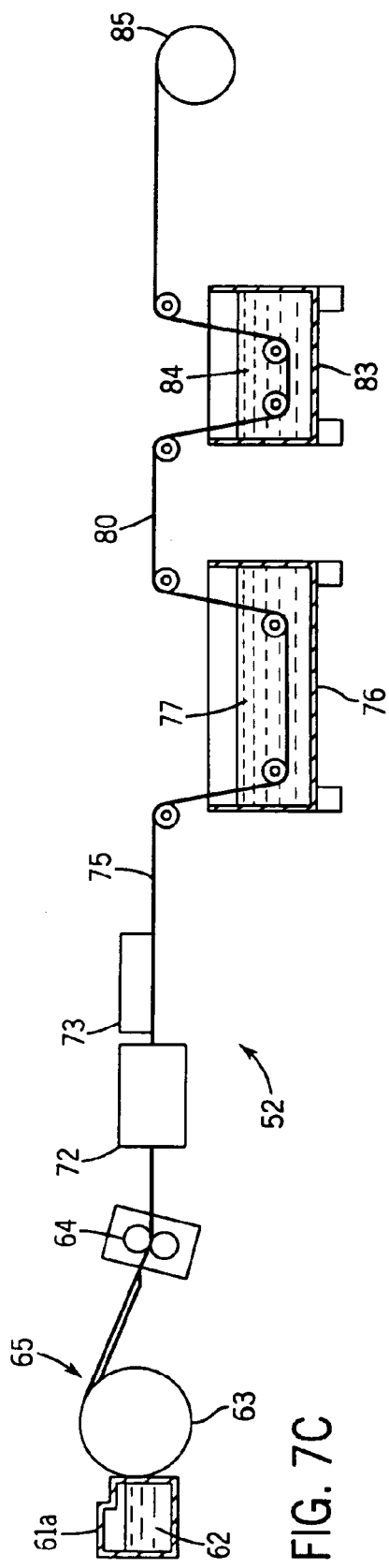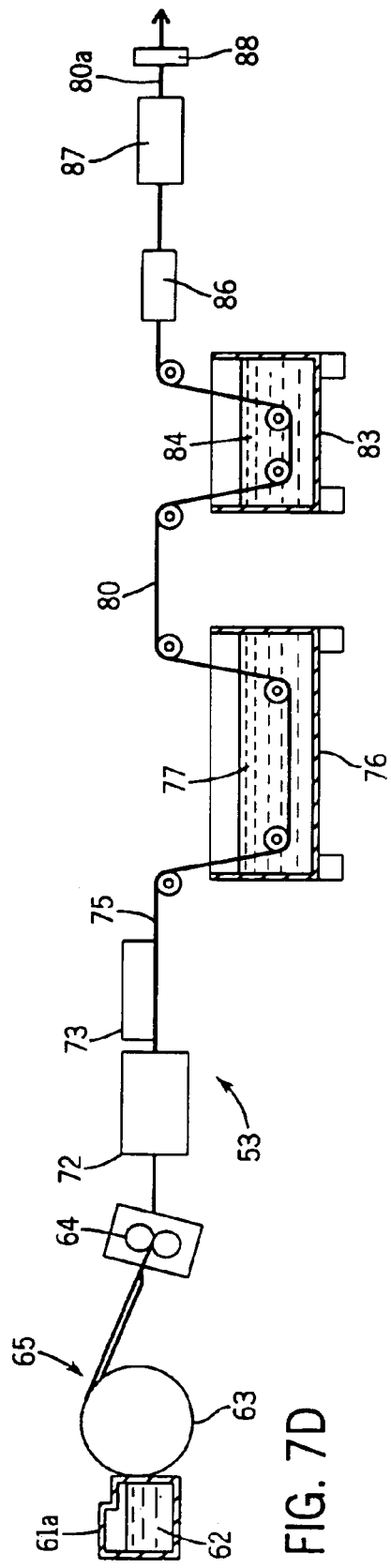

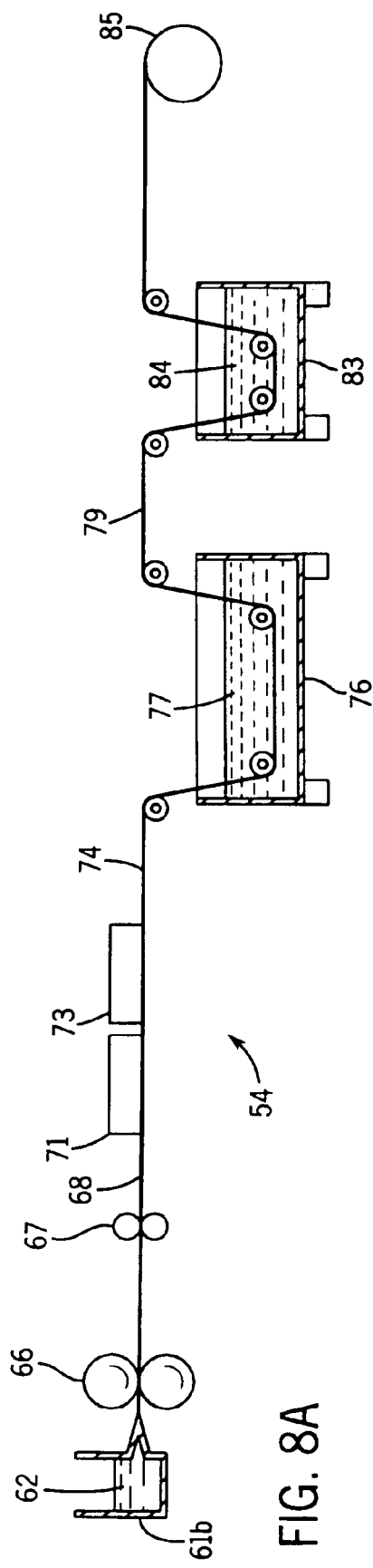
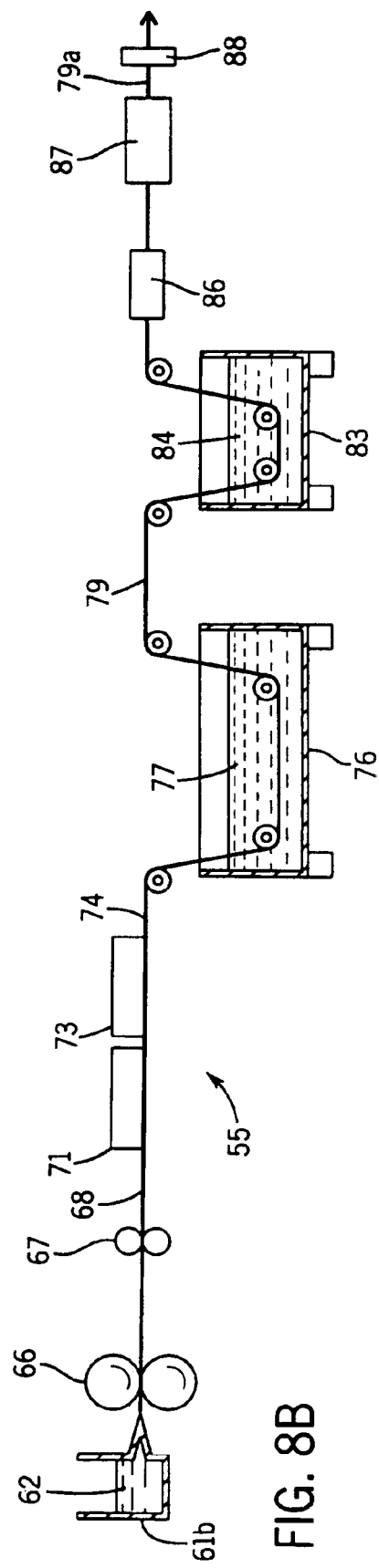
FIG. 8A
FIG. 8B

BATTERY GRID

BACKGROUND OF THE INVENTION

1. Field of the Invention

The present invention relates to the modification of battery grids of the type used in lead-acid storage batteries, and more particularly, it relates to a modification of the surface finish of the battery grids of a lead-acid storage battery to improve paste adhesion and the service life of the battery.

2. Description of the Related Art

Lead-acid storage batteries typically comprise several cell elements which are encased in separate compartments of a container containing sulfuric acid electrolyte. Each cell element includes at least one positive plate, at least one negative plate, and a porous separator positioned between each positive and negative plate. The positive and negative plates each comprise a lead or lead alloy grid that supports an electrochemically active material. The active material is a lead based material (i.e., PbO, $PbO_2$, Pb or $PbSO_4$ at different charge/discharge stages of the battery) that is pasted onto the grid. The grids provide an electrical contact between the positive and negative active materials which serves to conduct current.

Lead-acid battery manufacturing technologies and materials have improved dramatically in the last few decades. One early revolution was the use of battery grid materials that produce a "maintenance-free" battery. Because pure lead is too soft for the manufacturing processes used to form battery grids, various alloying elements have been added to lead over the years to produce battery grids of sufficient strength to withstand battery manufacturing processes. For example, antimony was added to lead as lead-antimony alloys were found to be capable of being formed into battery grids at acceptable commercial rates by way of gravity casting techniques. However, it was discovered that when a lead-antimony alloy is used in battery grids, water loss occurs because of gassing. Therefore, batteries having lead-antimony grids required periodic maintenance, i.e., the addition of water to the battery. In order to lower the gassing rate of batteries, lead-calcium battery grids were developed. Batteries using lead-calcium alloy grids have low gassing rates, and therefore, do not require the addition of water. As a result, the use of lead-calcium alloy battery grids has led to the introduction of "maintenance-free" batteries.

Another significant revolution in lead-acid battery manufacturing has been the manufacturing of battery plates in a continuous process, instead of the traditional methods in which battery grids are made using a conventional gravity cast book mold operation and the cast grids are later pasted in a separate step. In a typical continuous battery plate making method, a lead alloy strip is manufactured, either by casting (namely, cast strip) or by casting and rolling (namely, wrought strip), and the strip is subsequently expanded or punched to generate the desired grid pattern in a strip of interconnected battery grids. Typically, lead alloys having a relatively high level of calcium are used in continuous grid making processes as higher calcium levels tend to increase the hardness of the battery grids which is beneficial in punching and expansion processes. Previously prepared active material battery paste (which may be prepared by mixing lead oxide, sulfuric acid, water, and optionally dry additives, such as fiber and expander) is then applied to the strip of interconnected battery grids and the strip is parted into single battery plates. The main advantages of continuous battery plate making are production rate, dimensional control, thinner plates, lower strap rate and lower manufacturing costs. The pasted plates are next typically cured for many hours under elevated temperature and humidity to oxidize free lead (if any) and adjust the crystal structure of the plate. After curing, the plates are assembled into batteries and electrochemically formed by passage of current to convert the lead sulfate or basic lead sulfate(s) to lead dioxide (positive plates) or lead (negative plates). This is referred to as the "formation" process.

It is well known that lead-acid batteries will eventually fail in service through one or more of several failure modes. Among these failure modes is failure due to corrosion of the grid surface. Electrochemical action corrodes the grid surface and reduces the adhesion between the active material and the grid. In most instances, failure of the battery occurs when the grids are no longer able to provide adequate structural support or current flow due to the separation of the active material from the grid. It has been determined that negative lead-acid battery plates made by a continuous plate making method as described above have performed at least as well in service (cycle) life as negative plates made from conventional gravity cast book mold grids. However, positive lead-acid battery plates made by a continuous plate making method underperform in service (cycle) life as compared to gravity cast book mold grids, especially in the high temperature environment under the hood of today's more compact cars. In particular, lead-acid batteries having positive plates made by a continuous plate making method from lead-calcium alloys have proven to be relatively short-lived as determined by the SAE J240B Life Cycle Test (at 40° C. and particularly at 75° C.) owing to corrosion of the grid surface which forms an electrically resistive layer between the active material and the grid and seemingly reduces the adhesion between the active material and the grid over the course of the test. Lead-calcium grid batteries are particularly susceptible to early failure for the high temperature (75° C.) J240 test, and are short-lived compared to similar batteries made with lead-antimony grids.

Therefore, there have been efforts to improve the service life of a lead-acid battery having continuously manufactured plates, particularly by increasing the adhesion of positive grids to the active paste material. For example, a method for extending the cycle life of a lead-acid storage battery is disclosed in U.S. Pat. No. 5,858,575. In this method, a continuous length of unexpanded strip or a continuous length of preexpanded grid strip, each of which is formed from a lead-calcium alloy, is coated with a layer of a tin, lead-antimony, lead-silver or lead-tin alloy by hot dipping in a melt of the alloy. The layer of metal on the surface of the grid promotes better adhesion of the active material paste to the grid.

Another similar method is described in U.S. Pat. No. 4,906,540 which discloses a method wherein a layer of a lead-tin-antimony alloy is roll-bonded to a strip formed of a lead-calcium alloy. The strip is then expanded into a continuous length of grids. It is stated that the surface layer of the lead-tin-antimony alloy enables the battery active material to be retained for a long period of time. The increased adhesion of the paste to the grid serves to improve the cycle life of the battery.

Yet another similar method is described in Japanese Patent Publication No. 10-284085 which discloses a method wherein a coating of a lead-antimony-selenium alloy is fused to a lead-calcium-tin alloy strip and the strip is thereafter punched and/or expanded to form battery grids. The grids formed by this process are believed to increase battery life.

Still another similar method is described in U.S. Pat. No. 4,761,356 which discloses a method wherein a lead-calcium alloy strip is coated with a lead-tin alloy by dipping, spray coating or plating, and the coated alloy strip is thereafter punched or expanded to form a continuous strip of battery grids. The use of a process wherein the lead-calcium strip is punched or expanded after coating with a lead-tin alloy produces a grid with the lead-calcium alloy exposed at areas where grid material is punched out of the strip. The alloy coating is reported to improve recovery after over-discharge.

The formation efficiency of lead-acid batteries also depends to a great extent on the positive plate, in particular, to the extent of conversion of lead monoxide (PbO) to lead dioxide ($PbO_2$) in the active positive material. The high electrical potential required for formation appears to be related to the transformation of non-conductive paste materials to $PbO_2$. A low formation efficiency of positive plates requires a high formation charge. Inefficient charging also leads to deficiencies in the resulting batteries assembled with such plates. Typically, the initial capacity (performance) of the battery is low if the battery is not completely formed, requiring additional cycling to reach specific performance values. It is well known that by increasing the adhesion between the paste mixture and the grid, formation efficiency can be improved. Among other things, the increased adhesion between the grid and the paste provides for improved interfacial contact between the grid and paste thereby improving current flow between the grid and paste.

Thus, it can be seen that the adhesion between a battery grid and battery active material may affect, among other things, battery formation processes and battery service life. Accordingly, various methods, such as those mentioned above, have been proposed to improve the adhesion between a battery grid and battery active material, and thereby improve battery service life.

However, all of the aforementioned methods have certain disadvantages that limit the ability of these methods to attain maximum effectiveness in improving battery service life. For instance, the methods disclosed in U.S. Pat. Nos. 4,906, 540 and 4,761,356 and Japanese Patent Publication No. 10-284085 all form a battery grid by applying an alloy coating to a strip and thereafter punching or expanding the strip to form battery grids. As a result, the alloy coating will not be present on the grid wire surfaces that face the openings that are formed in the strip when the strip is punched or slit and expanded. Therefore, the beneficial effects of the alloy coating on paste adhesion and service life will be necessarily limited as the entire surface of the grid wires will not be coated. In addition, the coating methods disclosed in U.S. Pat. No. 5,858,575 are used with expanded metal grids (as shown in FIG. 1 of U.S. Pat. No. 5,858,575) which are known to have inferior charge/discharge efficiency as compared to stamped grids, such as that shown in U.S. Pat. No. 5,989,749. The decreased charge/discharge efficiency of the expanded grids also limits the service (cycle) life of a battery.

Therefore, there continues to be a need in the battery manufacturing field for even more effective methods for improving the service life of a battery. More particularly, there is a need for a method that can more greatly increase the adherence of active material to a battery grid produced by a continuous process.

SUMMARY OF THE INVENTION

The foregoing needs in the art are achieved by a method of forming battery grids or battery plates that includes the step of applying a lead alloy coating to a continuous strip of interconnected battery grids formed from a lead alloy grid material. Each of the interconnected battery grids includes a grid network bordered by at least one frame element. The grid network comprises a plurality of spaced apart grid wire elements, each of which has opposed ends joined to one of a plurality of nodes thereby defining a plurality of open spaces in the grid network. In one version of the invention, the strip of interconnected battery grids is immersed in a melt of the lead alloy coating to apply the lead alloy coating to the strip of interconnected battery grids. The alloy coated strip of interconnected battery grids is subsequently pasted and cut into individual battery plates, or cut into individual battery grids for later pasting.

Optionally, at least a portion of the grid wire elements are deformed (such as by coining) at a position intermediate the opposed ends of the grid wire element before the lead alloy coating is applied to the strip of interconnected battery grids. This produces grid wire elements wherein a first transverse cross-section taken at the position intermediate the opposed ends of the grid wire element differs from a second transverse cross-section taken at one of the opposed ends of the grid wire element. The strip of coated interconnected grids may also be quenched and thereafter age hardened.

Various methods may be used to form the strip of interconnected battery grids. For example, grid material may be punched out of a continuous strip of grid material to form the strip of interconnected battery grids. Alternatively, the strip of interconnected battery grids may be formed by slitting and expanding a continuous strip of grid material. Also, the strip of interconnected battery grids may be formed by continuously casting a melt of the grid material (e.g., on a rotating drum).

There are several advantages to coating the strip of interconnected battery grids after the grid network has been formed. First, the molten lead alloy coating transfers heat to the surface of the strip of interconnected battery grids thereby resolutionizing the surface of the strip of interconnected battery grids. The grains at the surface of the strip of interconnected battery grids recrystallize into larger grains which have an increased resistance to creep. Second, the alloy coating is applied to all surfaces of the grid network thereby improving paste adhesion on all grid wire surfaces, not just the grid wire surfaces parallel to the longitudinal plane of the strip of interconnected grids. Third, the alloy coating provides a cast-like surface structure with increased surface area on all surfaces of the grid network thereby improving adhesion on all grid wire surfaces, not just the grid wire surfaces parallel to the longitudinal plane of the strip of interconnected grids. In addition, increased surface area reduces current density, corrosion rate and increases charging ability.

It is therefore an advantage of the present invention to provide a method that increases the cycle life of a battery by enhancing the adhesion between the battery active material and the battery grid.

It is a further advantage to provide a method that increases the formation efficiency of a battery by enhancing the adhesion between the battery paste material and the battery grid.

It is yet another advantage to provide a method that can modify the shape of wires of a battery grid made from a continuous process so that the paste can flow around the grid wires to improve the plate strength.

It is still another advantage of the present invention to provide a method of making battery grids that allows a battery manufacturer to take advantage of a low cost continuous grid making process without the drawbacks associated with inadequate paste adhesion such as reduced formation efficiency and reduced cycle life.

It is yet another advantage of the present invention to provide a method of making battery plates or battery grids that produces a battery grid having increased grain size near the surface of the battery grid.

It is still another advantage of the present invention to provide a method of making battery plates or battery grids that produces a battery grid with increased surface area thereby increasing interfacial contact and mechanical bonding between the grid and battery paste.

BRIEF DESCRIPTION OF THE DRAWINGS

These and other features, aspects, and advantages of the present invention will become better understood upon consideration of the following detailed description, appended claims and accompanying drawings where:

FIG. 7A is a schematic illustration of one apparatus that may be used to practice the method of the present invention and produce a battery grid according to the invention;

FIG. 7B is a schematic illustration of another apparatus that may be used to practice the method of the present invention and produce a battery grid according to the invention;

FIG. 7C is a schematic illustration of yet another apparatus that may be used to practice the method of the present invention and produce a battery grid according to the invention;

FIG. 7D is a schematic illustration of still another apparatus that may be used to practice the method of the present invention and produce a battery grid according to the invention;

FIG. 8A is a schematic illustration of another apparatus that may be used to practice the method of the present invention and produce a battery grid according to the invention;

FIG. 8B is a schematic illustration of yet another apparatus that may be used to practice the method of the present invention and produce a battery grid according to the invention;

Figure 1:
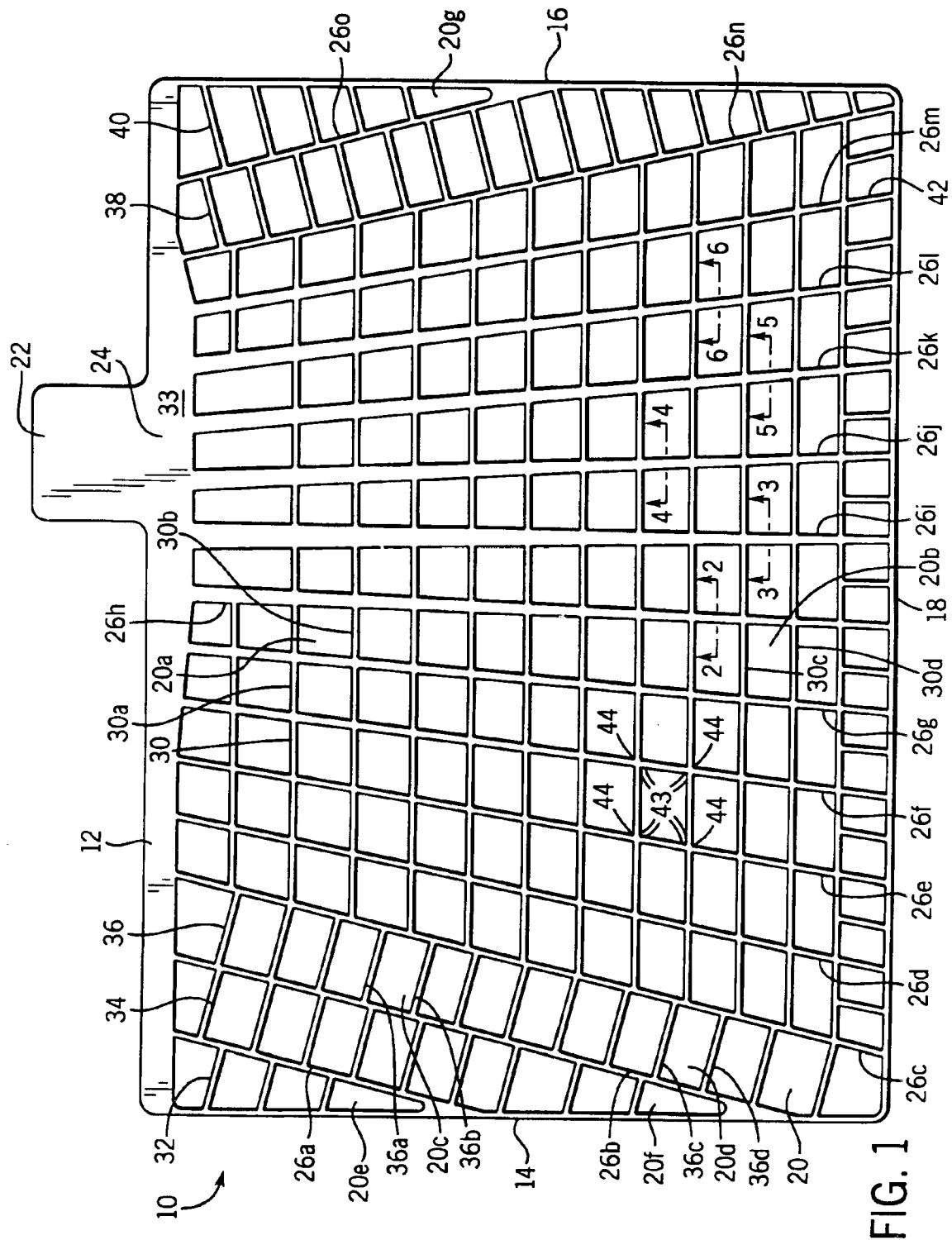
FIG. 1 shows a front view of a battery grid made in accordance with one version of the method of the present invention.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

Like reference numerals will be used to refer to like or similar parts from Figure to Figure in the following description of the drawings.

DETAILED DESCRIPTION OF THE INVENTION

FIG. 1 shows a front view of a battery grid made in accordance with one version of the method of the present invention. The grid is a stamped grid made of a lead alloy grid material coated with a lead alloy, and functions in the same manner as other battery grids known in the art. It should be noted that an infinite number of grid designs may result from the present invention and therefore, it is not the intent of the following description to limit the invention to the grid design shown in FIG. 1, which is presented for the purposes of illustration.

Referring now to FIG. 1, the grid 10 comprises a frame that includes a top frame element 12, first and second side frame elements 14 and 16, and a bottom frame element 18. The grid 10 includes a series of grid wires that define open areas 20 that hold the electrochemical paste (not shown) that provides the current generation. A current collection lug 22 is integral with the top frame element 12 and is offset from the center of the top frame element 12. The top frame element 12 includes an enlarged conductive section 24 directly beneath the lug 22, and has the shape shown to optimize current conduction to the lug 22.

A series of radially extending vertical grid wire elements 26a–26o form part of the grid 10. The vertical wire elements 26c–26n are connected to the top frame element 12 and the bottom frame element 18, the vertical wire elements 26a–26b are connected to the top frame element 12 in the first side frame element 14, and the vertical wire element 26o is connected to the top frame element 12 and the side frame element 16, as shown. The vertical wire element 26i is parallel to the side elements 14 and 16, and the remaining vertical wire elements 26a–26h and 26j–26o extend radially toward an imaginary intersecting point along a radius line running through the vertical element 26i. The vertical wire elements 26a–26o go become closer together when moving from the bottom element 18 towards the top element 12 and get farther apart when moving towards the left element 14 or the right element 16 from the vertical element 26i.

The grid 10 also includes a plurality of horizontal or cross wire elements. The cross wire elements include a set of parallel horizontal wire elements 30 positioned in a middle portion of the grid 10. Additionally, the grid 10 includes a first set of cross wire elements 32 connected between the left frame element 14 and the vertical element 26*a* that are parallel to each other, a second set of cross wire elements 34 connected between the vertical elements 26*a* and 26*b* that are parallel to each other, and a third set of cross wire elements 36 connected between the vertical elements 26*b* and 26*c* that are parallel to each other at the left side of the grid 10. Also, the grid 10 includes a fourth set of cross wire elements 38 connected between the vertical elements 26*n* and 26*o* that are parallel to each other and a fifth set of cross wire elements 40 connected between the vertical elements 26*o* and the right frame element 16 that are parallel to each other at the right side of the grid, as shown. A series of short support wires 42 are connected to the bottom frame member 18 as shown.

Individual sections of the vertical wire elements 26*a*–26*o* and the horizontal wire elements 30 or the cross wire elements 32–40 have opposed ends 43 which are joined at a plurality of nodes 44 that define the open areas 20 that support the electrochemical paste for conduction.

The grid wire cross-sections shown in FIGS. 2–6A illustrate various versions of a grid wire section formed by one version of the method of the invention described below. In the battery grid, each grid wire section may have a different cross-sectional configuration, or each grid wire section may have the same cross-sectional configuration. However, it is preferred that each grid wire section have the same cross-sectional configuration. It is also important to note that although certain features of the invention have been illustrated in FIGS. 2–6A by way of cross-sectional views of vertical grid wires, the same cross-sectional views could apply when taking a cross-section of horizontal grid wires. In other words, the similar deformation methods as illustrated in FIGS. 2 to 6A can also be applied to the horizontal wire elements. Depending on the needs, a grid can be deformed at the vertical wire elements only, or at both the vertical and horizontal wire elements, or not deformed at any of the wire elements.

Figure 2:
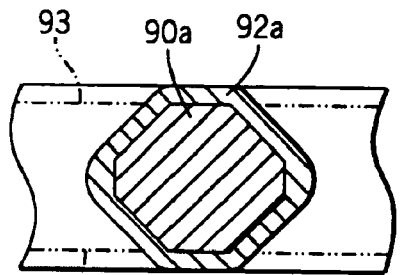
FIG. 2 shows a cross-section of a vertical grid wire section taken along line 2—2 of FIG. 1.

FIG. 2 shows a cross-section of a section of vertical wire element 26*h* taken at a position between the opposed ends of the grid wire section. It can be seen that at the position between the opposed ends of this grid wire section, the cross-section of the grid wire includes a grid wire base 90*a* which is substantially an octagon, and an alloy coating 92*a*. Also shown in phantom at 93 is the interface between the grid wire base 90 and the alloy coating 92 below the opposed flat planar surfaces 33 of the grid. It can be appreciated by those in the art that a battery grid wire section or node will not have a perfect geometric configuration and that the rounding of edges and corners of a grid wire section, base, coating surface, or node is often the result of a manufacturing operation. For this reason, the description of cross-sectional shapes in the specification will be proceeded by the word "substantially" to indicate that the cross-sectional shape may vary somewhat from a perfect geometric shape.

Figure 3:
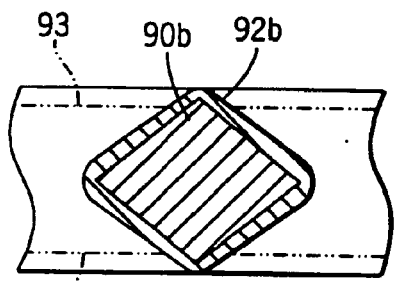
FIG. 3 shows a cross-section of a vertical grid wire section taken along line 3—3 of FIG. 1.

FIG. 3 shows a cross-section of a section of vertical wire element 26*i* taken at a position between the opposed ends of the grid wire section. It can be seen that at the position between the opposed ends of this grid wire section, the cross-section of the grid wire includes a grid wire base 90*b* has been rotated 45 degrees in relation to the node and has a substantially rectangular cross-section. The cross-section of the grid wire also shows an alloy coating 92*b*. Also shown in phantom at 93 is the interface between the grid wire base 90*b* and the alloy coating 92*b* below the opposed flat planar surfaces 33 of the grid.

Figure 4:
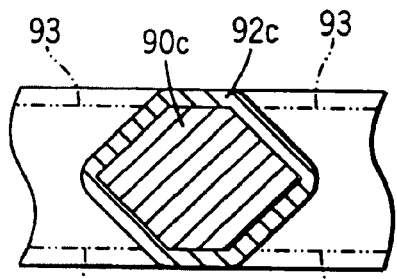
FIG. 4 shows a cross-section of a vertical grid wire section taken along line 4—4 of FIG. 1.

FIG. 4 shows a cross-section of a section of vertical wire element 26*j* taken at a position between the opposed ends of the grid wire section. It can be seen that at the position between the opposed ends of this grid wire section, the cross-section of the grid wire includes a grid wire base 90*c* which is substantially a hexagon and an alloy coating 92*c*. The grid wire base 90*c* has opposed surfaces which are coplanar with the surface of the adjacent nodes. Also shown in phantom at 93 is the interface between the grid wire base 90*c* and the alloy coating 92*c* below the opposed flat planar surfaces 33 of the grid.

Figure 5:
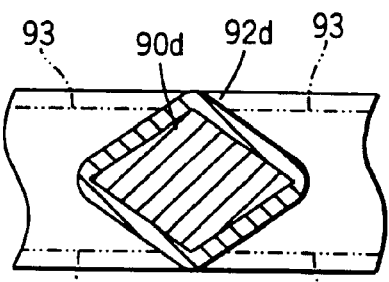
FIG. 5 shows a cross-section of a vertical grid wire section taken along line 5—5 of FIG. 1.

FIG. 5 shows a cross-section of a section of vertical wire element 26*k* taken at a position between the opposed ends of the grid wire section. It can be seen that at the position between the opposed ends of this grid wire section, the cross-section of the grid wire includes a grid wire base 90*d* which is substantially a diamond and an alloy coating 92*d*. Also shown in phantom at 93 is the interface between the grid wire base 90*d* and the alloy coating 92*d* below the opposed flat planar surfaces 33 of the grid.

Figure 6A:
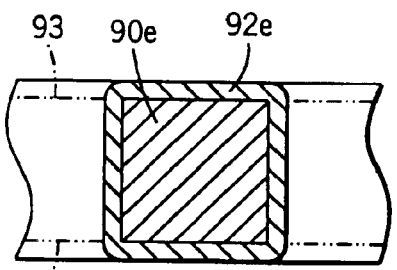
FIG. 6A shows a cross-section of a vertical grid wire section taken along line 6—6 of FIG. 1.

FIG. 6A shows a cross-section of a section of vertical wire element 26*l* taken at a position between the opposed ends of the grid wire section. This figure shows the configuration of a conventional stamped battery grid wherein the cross section of the node and the cross-section at all positions along the grid wire section are substantially rectangular and the surfaces of the node and grid wire section (which includes a grid wire base 90*e*) include an alloy coating 92*e*. Also shown in phantom at 93 is the interface between the grid wire base 90*e* and the alloy coating 92*e* below the opposed flat planar surfaces 33 of the grid.

Figure 6B:
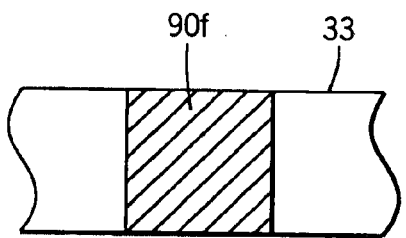
FIG. 6B shows a cross-section of a vertical grid wire section without an alloy coating taken along line 6—6 on FIG. 1.

FIG. 6B shows another version of the cross-section of a section of vertical wire element 26*l* taken at a position between the opposed ends of the grid wire section wherein the grid does not include an alloy coating. It can be seen that the cross-section of the node and the cross-section at all positions along the grid wire section are substantially rectangular and the cross-sectional area of each grid wire does not extend above or below opposed flat planar surfaces 33 of the grid.

Figure 6C:
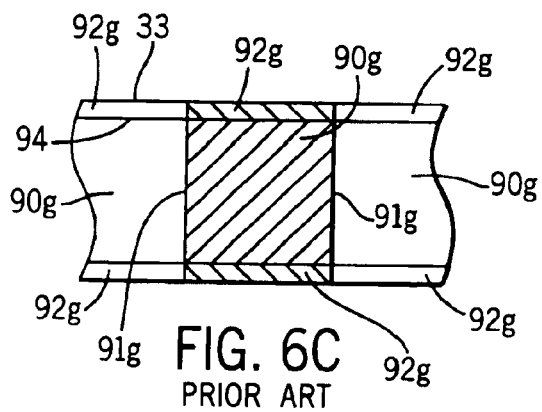
FIG. 6C shows a cross-section of a vertical grid wire section having a partial alloy coating taken along the line 6—6 of FIG. 1.

FIG. 6C shows yet another version of the cross-section of a section of vertical wire element 26*l* taken at a position between the opposed ends of the grid wire section. In this cross-section of the grid wire, there is shown a grid wire base 90*g* and an alloy coating 92*g*. The alloy coating 92*g* is disposed on the flat planar surfaces 33 of the grid; however, no alloy coating is present on surfaces 91*g* of the grid wire element that are transverse to the flat planar surfaces 33. The grid of FIG. 6C may be produced by the method of U.S. Pat. Nos. 4,906,540 and 4,761,356.

One advantage of the battery grid construction shown in FIGS. 2–6A can be best understood with reference to FIGS. 6A and 6B. FIG. 6A shows the configuration of a conventional stamped battery grid that has been coating with an alloy coating 92*e* after stamping. The cross section of the node and the cross-section at all positions along the grid wire section comprising the grid wire base 90*e* are substantially rectangular. However, the surface of the alloy coating 92*e* is slightly rounded at the regions near the four corners of the grid wire base 90*e*. When applying battery paste to a grid as in FIG. 6A, the slightly rounded grid wires allow the paste to flow around the wire. The rough surface of the wires provide a mechanical graft and interlock of paste particles. Therefore, the contact between the grid and the battery paste is good and the plate is strong. FIG. 6B shows the configuration of a conventional stamped battery grid wherein the cross section of the node and the cross-section at all positions along the grid wire section 90f are substantially rectangular. When applying battery paste to a grid as in FIG. 6B, it is much more difficult to make good contact between the battery paste and the surface of the wire moving in a direction perpendicular to the direction in which the paste is applied because the flow of paste must change in a 90 degree step. This is analogous to the situation where water flows down a 90 degree cliff, and the surface right below the edge of the cliff is not contacted by the falling water. With a grid wire orientation other than 90 degrees, the change of paste flow is gradual and continuous and therefore, provides better paste coverage. When the battery paste is cured and dried, it will shrink and generate tensile force at the paste/grid interface. The tensile force at the paste/grid wire interface is at a maximum when the wire surface is perpendicular to the grid surface and at a minimum when the wire surface is parallel to the grid surface. As a result, a gap is formed between the grid wire and the paste at the location where the tensile force is the maximum. This type of plate is weak and the paste will fall off easily. Because of a lack of contact between the paste and the grid, a battery made with this type of plate is much more difficult to form, performs poorly in certain reserve capacity tests, and does not exhibit satisfactory cycle life.

Having shown an exemplary alloy coated battery grid that may be produced by one version of the invention, a number of apparatus for forming battery grids in accordance with the invention may be described. In FIG. 7A, there is shown one apparatus, indicated generally at 50, for practicing the method of the present invention and for forming a battery grid in accordance with the invention. The apparatus 50 includes a heated lead pot 61a, which contains the molten lead alloy 62 that forms the base of the battery grids, and an internally cooled rotating casting drum 63. In operation, the molten lead alloy 62 contacts the cooled drum surface and freezes to form a solid lead alloy strip 65 of substantially constant width and thickness. A suitable lead alloy strip drum casting device that may be used in the apparatus 50 is shown and described in U.S. Pat. No. 3,926,247 or U.S. Pat. No. 5,462,109, which are incorporated herein by reference. The lead alloy strip 65 may optionally be rolled by rollers 64 to change the thickness and grain structure of the strip 65. The continuous strip 65 is then fed into a punching station 71 wherein a series of interconnected battery grids is formed by punching grid material out of the continuous strip 65.

During punching operations in the punching station 71, the strip 65 is maintained as a continuous strip and preferably the interconnected battery grid shapes and formed in a progressive punching operation, i.e., features are added to the battery grid through several punching operations. The punching station 71 may form a strip of interconnected battery grids, each of which has a configuration such as that shown in FIG. 1.

After the strip exists the punching station 71, the battery grid wire sections of the strip may optionally be processed in a coining station 73. The coining station 73 is used to deform or coin the grid wires so that the grid wires have a cross-section similar to one of the grid wire cross-sections 90a, 90b, 90c or 90d shown in FIGS. 2–5. For instance, the coining station 73, may include a die or dies that deform the rectangular cross-section of the grid wires of the punched grid into an octagonal cross-section 90a as shown in FIG. 2. The other exemplary wire cross-sections shown in FIGS. 3–5 may also be formed. The strip of punched (and optionally, coined) interconnected battery grids 74 exiting the punching station 71 (and optionally, the coining station 73) is fed through an alloy coating bath 76 that contains a molten lead alloy 77 to form a strip of alloy coated interconnected battery grids 79. The length of the alloy coating bath 76 may vary with the composition of the molten lead alloy 77, the thickness of the alloy coating to be deposited, and the rate at which the strip of punched interconnected battery grids 74 moves through the alloy coating bath 76. The strip of alloy coated interconnected battery grids 79 is then fed through a quench bath 83 containing quench fluid 84 (preferably water) and is coiled onto a take up reel 85. The quenching preserves the resolutionized grains of the strip of alloy coated interconnected battery grids 79 in a much more stable condition. The reel of alloy coated interconnected battery grids 79 may then be age hardened. While the reel of alloy coated interconnected battery grids 79 can be age hardened at room temperature (i.e., 25° C.), it is preferred to age harden the reel of alloy coated interconnected battery grids 79 at an elevated temperature (i.e., above 25° C.). Thereafter, the reel of alloy coated interconnected battery grids 79 may be uncoiled and fed to a paster (such as that shown and described in U.S. Pat. No. 4,606,383) and parted into battery plates (as is known in the art) for assembly into a battery. Alternatively, the reel of alloy coated interconnected battery grids 79 may be uncoiled and divided into individual battery grids which are subsequently pasted to form battery plates.

In FIG. 7B, there is shown another apparatus, indicated generally at 51, for practicing the method of the invention and for forming a battery grid in accordance with the invention. In the apparatus 51, a strip of alloy coated interconnected battery grids 79 is produced using the casting drum 63, the punching station 71, the coining station 73 (if desired), the alloy coating bath 76 and the quench tank 83 as in the apparatus 50 of FIG. 7A. However, in the apparatus 51 of FIG. 7B, the strip of alloy coated interconnected battery grids 79 enters an oven 86 after exiting the quench tank 83 in order to immediately age harden the strip of alloy coated interconnected battery grids 79 after quenching. After age hardening in the oven 86, the strip of alloy coated interconnected battery grids 79 is fed through a paster 87 where conventional battery paste is applied to the strip of alloy coated interconnected battery grids 79. A strip of pasted alloy coated interconnected battery grids 79a exits the paster 87 and is separated into individual battery plates in a parter 88 before assembly into a battery.

In FIG. 7C, there is shown another apparatus, indicated generally at 52, for practicing the method of the invention. In the apparatus 52, a lead alloy strip 65 is formed using the casting drum 63 as in the apparatus 50 of FIG. 7A. The lead alloy strip 65 is then expanded into a strip of interconnected battery grids 75 in an expander 72. A suitable apparatus for expanding the lead alloy strip 65 into the strip of interconnected battery grids 75 is shown and described in U.S. Pat. No. 4,291,443 which is incorporated herein by reference. After the strip of interconnected battery grids 75 exits the expander 72, the battery grid wire sections of the strip may optionally be processed in a coining station 73 as described above with reference to the apparatus 50 of FIG. 7A. The strip of interconnected battery grids 75 is then fed through the alloy coating bath 76 to form a strip of alloy coated interconnected battery grids 80 which is quenched in quench tank 83 and coiled onto take up reel 85. The reel of alloy coated interconnected battery grids 80 may then be heated to age harden the interconnected battery grids 80. The strip of interconnected battery grids 80 may be uncoiled and fed to a paster and parted into battery plates that are assembled into a battery. Alternatively, the reel of alloy coated interconnected battery grids 80 may be uncoiled and divided into individual battery grids which are subsequently pasted to form battery plates.

In FIG. 7D, there is shown another apparatus, indicated generally at 53, for practicing the method of the invention. In the apparatus 53, a strip of alloy coated interconnected battery grids 80 is produced using the casting drum 63, the expander 72, the coining station 73, the alloy coating bath 76 and the quench tank 83 as in the apparatus 52 of FIG. 7C. However, in the apparatus 53 of FIG. 7D, the strip of alloy coated interconnected battery grids 80 enters an oven 86 immediately after exiting the quench tank 83 in order to age harden the strip of alloy coated interconnected battery grids 80. After age hardening in the oven 86, the strip of alloy coated interconnected battery grids 80 is fed through a paster 87 where conventional battery paste is applied to the strip of alloy coated interconnected battery grids 80. A strip of pasted alloy coated interconnected battery grids 80a exits the paster 87 and is separated into individual battery plates in a parter 88 before assembly into a battery.

While the apparatus 52 of FIG. 7C and the apparatus 53 of FIG. 7D provide suitable results when used to practice the present invention, the apparatus 50 of FIG. 7A and the apparatus 51 of FIG. 7B are particularly advantageous in that complex battery grid shapes (such as that shown in FIG. 1) may be produced using the punching station 71 and optionally, the coining station 73. Specifically, the expander 72 used in the apparatus 52 of FIG. 7C and the apparatus 53 of FIG. 7D produces a continuous length of expanded metal grids that are limited in wire pattern, wire shape, and lead distribution. In contrast, the apparatus 50 of FIG. 7A and the apparatus 51 of FIG. 7B produce a continuous length of punched grids having optimized grid wire patterns, asymmetric and offset grid wire patterns, improved grid wire thickness control (grid wire aspect ratios), improved grid wire shape control, improved lead distribution in the grid (percent lead distribution from the top to the bottom of the grid), and grain control. As a result, the corrosion performance is enhanced because of the relatively stress free grain structure and low porosity of the punched sheet. In addition, the punching process does not substantially deform the grain or add other stresses into the grid which might lead to corrosion initiation sites. The electrical performance is enhanced as a result of unique and optimized grid wire patterns, improved control of grid wire size and optimized lead distribution within the grid. Thus, the apparatus 50 of FIG. 7A and the apparatus 51 of FIG. 7B produce a battery grid that has the advantages of optimized grid wire patterns and the advantages of an alloy coating.

In FIG. 8A, there is shown another apparatus, indicated generally at 54, for practicing the method of the present invention and for forming a battery grid in accordance with the invention. The apparatus 54 includes a heated lead pot 61b, which contains the molten lead alloy 62 that forms the base of the battery grids, and a pair of twin casting rollers 66. In operation, the molten lead alloy 62 contacts the roller surfaces and freezes to form a solid lead alloy strip 68 of substantially constant width and thickness. A suitable lead alloy strip roll casting device that may be used in the apparatus 54 is shown and described in U.S. Pat. No. 4,498,519, which is incorporated herein by reference. The lead alloy strip 68 may optionally be further rolled by rollers 67 to change the thickness and grain structure of the strip 68. The continuous strip 68 is then fed into a punching station 71 wherein a series of interconnected battery grids is formed by punching grid material out of the continuous strip 68.

During punching operations in the punching station 71, the strip 68 is maintained as a continuous strip and preferably the interconnected battery grid shapes and formed in a progressive punching operation, i.e., features are added to the battery grid through several punching operations. The punching station 71 may form a strip of interconnected battery grids, each of which has a configuration such as that shown in FIG. 1.

After the strip exists the punching station 71, the battery grid wire sections of the strip may optionally be processed in a coining station 73. The coining station 73 is used to deform or coin the grid wires so that the grid wires have a cross-section similar to one of the grid wire cross-sections 90a, 90b, 90c or 90d shown in FIGS. 2–5. For instance, the coining station 73, may include a die or dies that deform the rectangular cross-section fo the grid wires of the punched grid into an octagonal cross-section 90a as shown in FIG. 2. The other exemplary wire cross-sections shown in FIGS. 3–5 may also be formed. The strip of punched (and optionally, coined) interconnected battery grids 74 exiting the punching station 71 (and optionally, the coining station 73) is then fed through an alloy coating bath 76 that contains a molten lead alloy 77 to form a strip of alloy coated interconnected battery grids 79, as described with reference to FIG. 7A. The strip of alloy coated interconnected battery grids 79 is then fed through a quench fluid 84 and is coiled onto a take up reel 85. The reel of alloy coated interconnected battery grids 79 may then be heated to age harden the interconnected battery grids 79. The reel of alloy coated interconnected battery grids 79 may be uncoiled and fed to a paster and parted into battery plates that are assembled into a battery. Alternatively, the reel of alloy coated interconnected battery grids 79 may be uncoiled and divided into individual battery grids which are subsequently pasted to form battery plates.

In FIG. 8B, there is shown another apparatus, indicated generally at 55, for practicing the method of the invention and for forming a battery grid in accordance with the invention. In the apparatus 55, a strip of alloy coated interconnected battery grids 79 is produced using the twin roll caster 66, the punching station 71, the coining station 73 (if desired), the alloy coating bath 76 and the quench tank 83 as in the apparatus 54 of FIG. 8A. However, in the apparatus 55 of FIG. 8B, the strip of alloy coated interconnected battery grids 79 enters an oven 86 after exiting the quench tank 83 in order to age harden the strip of alloy coated interconnected battery grids 79. After age hardening, the strip of alloy coated interconnected battery grids 79 is fed through a paster 87 where conventional battery paste is applied to the strip of alloy coated interconnected battery grids 79. A strip of pasted alloy coated interconnected battery grids 79a exits the paster 87 and is separated into individual battery plates in a parter 88.

Figure 8C:
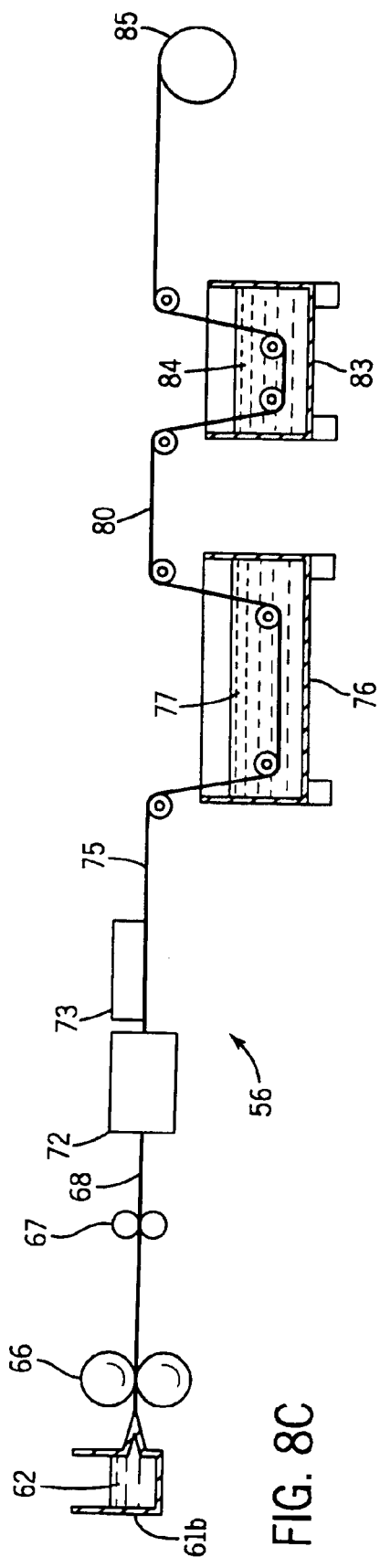
FIG. 8C is a schematic illustration of still another apparatus that may be used to practice the method of the present invention and produce a battery grid according to the invention.

In FIG. 8C, there is shown another apparatus, indicated generally at 56, for practicing the method of the invention. In the apparatus 56, a lead alloy strip 68 is formed using the twin roll caster 66 as in the apparatus 54 of FIG. 8A. The lead alloy strip 68 is then expanded into a strip of interconnected battery grids 75 in an expander 72. A suitable apparatus for expanding the lead alloy strip 68 into the strip of interconnected battery grids 75 is shown and described in U.S. Pat. No. 4,291,443. After the strip of interconnected battery grids 75 exits the expander 72, the battery grid wire sections of the strip may optionally be processed in a coining station 73 as described above with reference to the apparatus 50 of FIG. 7A. The strip of interconnected battery grids 75 is then fed through the alloy coating bath 76 to form a strip of alloy coated interconnected battery grids 80 which is quenched in quench tank 83 and coiled onto take up reel 85.

The reel of alloy coated interconnected battery grids 80 may then be heated to age harden the interconnected battery grids 80. The strip of interconnected battery grids 80 may be uncoiled and fed to a paster and parted into battery plates that are assembled into a battery. Alternatively, the reel of alloy coated interconnected battery grids 80 may be uncoiled and divided into individual battery grids which are subsequently pasted to form battery plates.

Figure 8D:
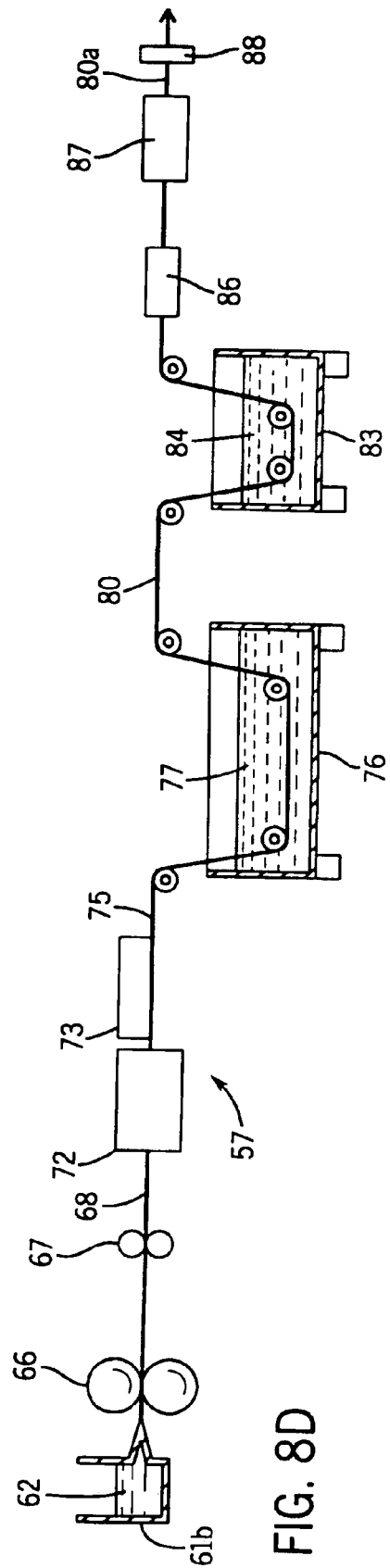
FIG. 8D is a schematic illustration of another apparatus that may be used to practice the method of the present invention and produce a battery grid according to the invention.

In FIG. 8D, there is shown another apparatus, indicated generally at 57, for practicing the method of the invention. In the apparatus 57, a strip of alloy coated interconnected battery grids 80 is produced using the twin roll caster 66, the expander 72, the coining station 73 (if desired), the alloy coating bath 76 and the quench tank 83 as in the apparatus 56 of FIG. 8C. However, in the apparatus 57 of FIG. 8D, the strip of alloy coated interconnected battery grids 80 enters an oven 80 after exiting the quench tank 83 in order to age harden the strip of alloy coated interconnected battery grids 80. After age hardening, the strip of alloy coated interconnected battery grids 80 is fed through a paster 87 where conventional battery paste is applied to the strip of alloy coated interconnected battery grids 80. A strip of pasted alloy coated interconnected battery grids 80a exits the paster 87 and is separated into individual battery plates in a parter 88.

Figure 9A:
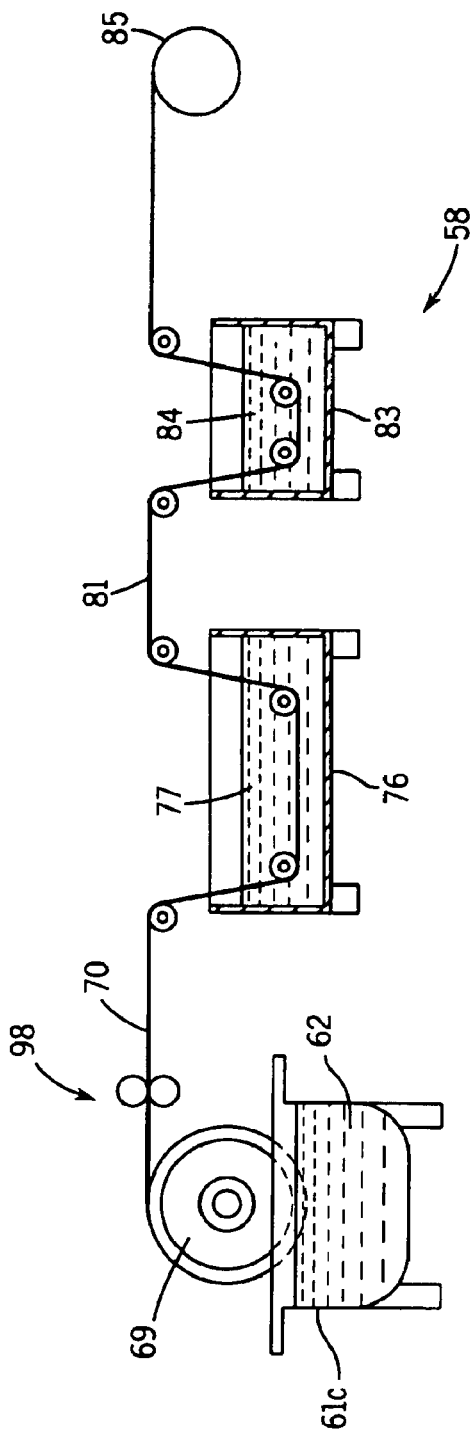
FIG. 9A is a schematic illustration of yet another apparatus that may be used to practice the method of the present invention and produce a battery grid according to the invention.

In FIG. 9A, there is shown another apparatus, indicated generally at 58, for practicing the method of the present invention and for forming a battery grid in accordance with the invention. The apparatus 58 includes a heated lead pot 61c, which contains the molten lead alloy 62 that forms the base of the battery grids, and a casting drum 69. In operation, the molten lead alloy 62 contacts the casting drum surfaces and freezes to form a strip of interconnected battery grids 70. A suitable casting device that may be used in the apparatus 58 to form the strip of interconnected battery grids 70 is shown and described in U.S. Pat. No. 4,349,067, which is incorporated herein by reference. Optionally, the strip of interconnected battery grids 70 removed from the surface of the casting drum 69 may be fed through one or more sets of rollers 98 in order to reduce the thickness of the strip of interconnected battery grids 70 as is shown and described in U.S. Pat. No. 5,611,128, which is incorporated herein by reference. The strip of interconnected battery grids 70 is then fed through an alloy coating bath 76 that contains a molten lead alloy 77 to form a strip of alloy coated interconnected battery grids 81, as described with reference to FIG. 7A. The strip of alloy coated interconnected battery grids 81 is then fed through a quench fluid 84 and is coiled onto a take up reel 85. The reel of alloy coated interconnected battery grids 81 may then be heated to age harden the interconnected battery grids 81. The reel of alloy coated interconnected battery grids 81 may be uncoiled and fed to a paster and parted into battery plates that are assembled into a battery. Alternatively, the reel of alloy coated interconnected battery grids 81 may be uncoiled and divided into individual battery grids which are subsequently pasted to form battery plates.

Figure 9B:
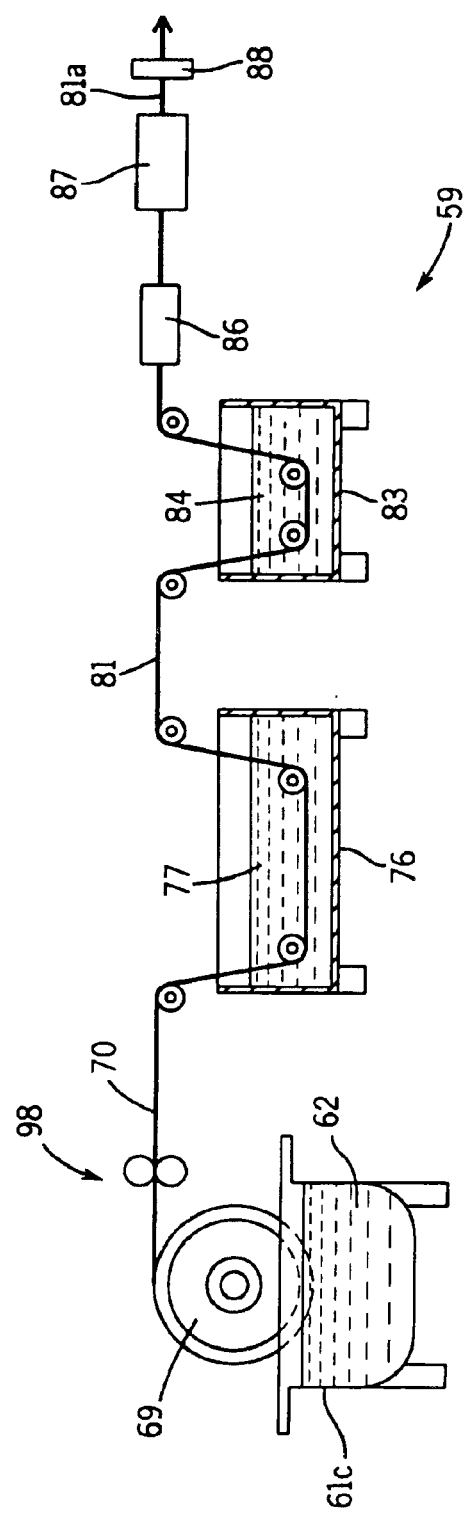
FIG. 9B is a schematic illustration of still another apparatus that may be used to practice the method of the present invention and produce a battery grid according to the invention.

In FIG. 9B, there is shown another apparatus, indicated generally at 59, for practicing the method of the present invention and for forming a battery grid in accordance with the invention. In the apparatus 59, a strip of alloy coated interconnected battery grids 81 is produced using the casting drum 69, optionally the rollers 98, the alloy coating bath 76 and the quench tank 83 as in the apparatus 58 of FIG. 9A. However, in the apparatus 59 of FIG. 9B, the strip of alloy coated interconnected battery grids 81 enters an oven 86 after exiting the quench tank 83 in order to age harden the strip of alloy coated interconnected battery grids 81. After age hardening, the strip of alloy coated interconnected battery grids 81 is fed through a paster 87 where conventional battery paste is applied to the strip of alloy coated interconnected battery grids 81. A strip of pasted alloy coated interconnected battery grids 81a exits the paster 87 and is separated into individual battery plates in a parter 88.

Various modifications may be made to the apparatus of FIGS. 7A–9B. For instance, the strip of interconnected battery grids 74 may optionally be fed through a fluxing station (not shown) before entering the alloy coating bath 76 in order to remove oxides from the surface of the strip of interconnected battery grids 74. A fluxing station may include a pool of flux in a tray underlying the advancing strip of interconnected battery grids 74, a rotating roller that absorbs and picks up flux from the pool and applies it to the underside of the strip of interconnected battery grids 74, and a nozzle overlying the strip of interconnected battery grids 74 for spraying flux onto the topside of the strip of interconnected battery grids 74. Other techniques, e.g. wetted sponges/applicators, for applying the flux to the strip of interconnected battery grids 74 may also be used. In another version of the invention, the alloy coating may be applied to the strip of interconnected battery grids 74 by spraying the alloy onto the strip of interconnected battery grids 74.

Another highly advantageous modification may be made to the apparatus of FIGS. 7A–9B. Specifically, the alloy coating bath 76 is modified such that a stream of inert gas (e.g., nitrogen or argon) may be purged or blown into the molten lead alloy 77 in the alloy coating bath 76. During coating of the strip of interconnected battery grids 74 in the alloy coating bath 76, the inert gas (e.g., nitrogen or argon) is blown into the molten lead alloy 77 such that bubbles form in the molten lead alloy 77. This provides at least three advantages: (1) the alloy coating that forms on the strip of interconnected battery grids 74 is porous and therefore, has a much higher surface area, which further enhances the grid/active material adhesion; (2) the alloy coating that forms on the strip of interconnected battery grids 74 has a lower mass and lower cost as compared to an alloy coating that forms on the strip of interconnected battery grids 74 without the introduction of inert gas into the molten lead alloy 77; (3) the inert gas acts as a shielding film as it is leaving the alloy coating bath 76 which prevents the top of the molten alloy bath from oxidizing thereby reducing dross and contamination of the alloy coating bath 76.

Having described various methods and apparatus for forming battery plates or battery grids in accordance with the invention, example grid materials and example coating materials that may be used to form a battery grid in accordance with the invention may be described. The lead alloy used to produce the solid lead alloy strip 65 in the casting drum 63 of the apparatus of any of FIGS. 7A–7D is selected in order to provide a cast alloy strip that may be punched or expanded into a strip of interconnected battery grids having an alloy composition suitable for the intended application of the lead-acid battery. For example, if a lead-acid battery is to be sold as a "maintenance-free" battery, a lead-calcium alloy will be selected for use as the lead alloy applied to the casting drum 63. It is well known in the art that an alloy having lead and calcium may also contain other alloyants such as tin, aluminum and silver. Accordingly, as used herein, the term "lead-calcium alloy" is not intended to be limited strictly to binary lead-calcium alloys, but shall also include alloys having lead and calcium as well as other alloying elements which are not deleterious to the battery or the maintenance-free character thereof. The alloying elements in the lead alloy can be varied to provide optimum performance of the casting drum 63 of the apparatus of any of FIGS. 7A–7D.

Likewise, the lead alloy used to produce the solid lead alloy strip 68 in the twin roll casting rollers 66 of the apparatus of any of FIGS. 8A–8D may be selected in order to provide a cast alloy strip that may be punched or expanded into a strip of interconnected battery grids having an alloy composition suitable for the intended application of the lead-acid battery. If a lead-acid battery is to be sold as a "maintenance-free" battery, a lead-calcium alloy as defined herein will be selected for use as the lead alloy applied to the twin roll casting rollers 66. The alloying elements in the lead alloy can be varied to provide optimum performance of the casting drum 66. Similarly, the lead alloy used to produce the strip of interconnected battery grids 81 using the casting drum 69 of the apparatus of any of FIGS. 9A–9B may be selected in order to provide a strip of interconnected battery grids 81 having an alloy composition suitable for the intended application of the lead-acid battery. If a lead-acid battery is to be sold as a "maintenance-free" battery, a lead-calcium alloy as defined herein will be selected for use as the lead alloy applied to the casting drum 69. The alloying elements in the lead alloy can be varied to provide optimum performance of the casting drum 69. One example lead-calcium alloy that is useful in the present invention includes lead, from about 0.060 wt. % to about 0.070 wt. % calcium, and from about 1.20 wt. % to about 1.50 wt. % tin. Another example lead-calcium alloy that is useful in the present invention includes lead, no less than about 0.8% tin, tin in a ratio to calcium of greater than about 12:1, and silver in the range of about 0 to about 0.02%, the percentages being based upon the total weight of the lead-based alloy. This example lead-calcium alloy is fully described in U.S. Pat. No. 6,117,594.

As detailed above, each of the apparatus shown in FIGS. 7A–9B produces a strip of interconnected battery grids that is subsequently coated with a lead alloy in the alloy coating bath 76. The lead alloy selected for the coating varies depending on the alloy used to produce the strip of interconnected battery grids. When the strip of interconnected battery grids is formed from a lead-calcium alloy as defined herein, suitable lead alloys for the coating include lead-tin and lead-antimony alloys. The precise composition of the coating is not particularly critical in terms of extending the lives of batteries. On the other hand, there are two general rules applicable to the selection of the lead alloy coating composition. First, the composition of the coating should be selected so as to provide a melt having a melting point which is sufficiently less than the melting point of the lead-calcium alloy strip of interconnected battery grids (e.g., about 620° F. for a typical Pb–0.07 wt. % Ca–1 to 1.5 wt. % tin alloy) so as to preclude complete melting of the strip of interconnected battery grids while it is immersed in the melt. Melting of the surface of the lead-calcium alloy strip of interconnected battery grids is acceptable and, in fact, may be desirable to promote metallurgical bonding of the alloy coating to the strip of interconnected battery grids. Second, the composition of the coating should be such that there is sufficient tin, antimony or other alloying elements present to dope the corrosion layer on the surface of the strip of interconnected battery grids (i.e., at the grid-active material interface) with oxides of the tin, antimony or other alloying elements, and thereby improve the conductivity of the corrosion layer and promote better adhesion of the leady active material to the grid.

Suitable lead-antimony alloys for coating the strip of interconnected battery grids include lead alloys having an antimony content varying from about 1% by weight to about 10% by weight. Other additives such as tin from about 1 wt. % to about 10 wt. % may also be used with the antimonial lead. Hence, the term lead-antimony alloy is not intended to be limited to alloys containing just lead and antimony, but rather is intended to include other low melting alloys thereof which do not negate the intended effects of the antimony or are otherwise deleterious to a battery. For coating a Pb—Ca—Sn alloy (i.e., 0.07 wt. % Ca, and 1 to 1.5 wt. % Sn) strip of interconnected battery grids which melts at about 620° F., the antimony content in the lead alloy coating will preferably be between about 0.5 wt. % and about 3 wt. %, and preferably the tin content in the lead alloy will be between about 2 wt. % and about 5 wt. % so as to have a melting point of about 590° F.

Similarly, suitable lead-tin alloys may be used as all melt at lower temperatures than the typical lead-calcium alloy strip of interconnected battery grids. Lead-tin alloys will preferably comprise about 1 wt. % to about 10 wt. % tin, but otherwise will be determined primarily on the basis of cost owing to the high cost of tin. One example alloy includes lead and about 4 wt. % to about 6 wt. % tin. Other alloyants could be added and therefore, the term lead-tin alloy is not intended to be limited to alloys containing just lead and tin, but rather intended to include other low melting alloys thereof which do not negate the intended effects of the tin or are otherwise deleterious to a battery or the maintenance-free character thereof.

The precise temperature of the melt is not particularly critical so long as it is not so hot as to completely melt the strip of interconnected battery grids in the brief time that the strip of interconnected battery grids are immersed in the melt. Hence, the melt temperature will, in many respects, be determined by the composition (and hence melting point) of the strip of interconnected battery grids being coated. Generally speaking, it is preferred that the temperature of the melt be maintained at a temperature that is at least about 20° F. below the melting point of the strip of interconnected battery grids. On the other hand, it is desirable that the temperature be sufficiently high as to melt some low melting phases on the surface of the strip of interconnected battery grids to promote better bonding of the coating to the strip of interconnected battery grids.

The invention is further illustrated in the following Examples which are presented for purposes of illustration and not of limitation.

EXAMPLE 1

A continuous strip was prepared from a lead-alloy having the following composition: 0.0425 wt. % calcium, 0.925 wt. % tin, 0.013 wt. % aluminum, 0.0125 wt. % silver and balance lead. A series of interconnected battery grid shapes were then formed in the strip in a progressive punching operation, i.e., features were added to the battery grid through several punching operations. The battery grid wire sections of the strip were then processed in a coining station to coin the grid wires so that the grid wires had a cross-section similar to the grid wire cross-sections 90c in FIG. 4. The interconnected battery grids were then divided into individual grids. The grids were then pasted with a conventional battery paste and formed into battery cells. The battery cells were then cycled in accordance with the SAE J240 life test procedure at a temperature of 75° C. (167° F.) to measure the service life.

EXAMPLE 2

A continuous strip was prepared from a lead-alloy having the following composition: 0.0425 wt. % calcium, 0.925 wt. % tin, 0.013 wt. % aluminum, 0.0125 wt. % silver and balance lead. A series of interconnected battery grid shapes were then formed in the strip in a progressive punching operation, i.e., features were added to the battery grid through several punching operations. The battery grid wire sections of the strip were then processed in a coining station to coin the grid wires so that the grid wires had a cross-section similar to the grid wire cross-sections 90c in FIG. 4. The interconnected battery grids were then divided into individual grids. The grids were then hand dipped into a pot of molten 94 wt. % lead—6 wt. % tin coating alloy. The grids were dipped slowly into the melt until they bottomed out in the pot and then slowly withdrawn at the same rate for a total immersion time of about 2 seconds. The coating was uniform with no excess buildup on the grid wires or the edges of the grids. The grids were then pasted with a conventional battery paste and formed into battery cells. The battery cells were then cycled in accordance with the SAE J240 life test procedure at a temperature of 75° C. (167° F.) to measure the service life. The number of cycles for battery cells having lead-tin alloy coated grids prepared in accordance with Example 2 was 20% higher than the number of cycles for the control battery cells having uncoated grids prepared in accordance with Example 1. This demonstrates that batteries including grids made in accordance with the present invention will have better cycle life performance than batteries including conventional grids.

EXAMPLE 3

A continuous strip was prepared from a lead-alloy having the following composition: 0.0425 wt. % calcium, 0.925 wt. % tin, 0.013 wt. % aluminum, 0.0125 wt. % silver and balance lead. A series of interconnected battery grid shapes were then formed in the strip in a progressive punching operation, i.e., features were added to the battery grid through several punching operations. The battery grid wire sections of the strip were then processed in a coining station to coin the grid wires so that the grid wires had a cross-section similar to the grid wire cross-sections 90c in FIG. 4. The interconnected battery grids were then divided into individual grids. The grids were then hand dipped into a pot of molten 94 wt. % lead—3 wt. % tin—3 wt. % antimony coating alloy. The grids were dipped slowly into the melt until they bottomed out in the pot and then slowly withdrawn at the same rate for a total immersion time of about 2 seconds. The coating was uniform with no excess buildup on the grid wires or the edges of the grids. The grids were then pasted with a conventional battery paste and formed into battery cells. The battery cells were then cycled in accordance with the SAE J240 life test procedure at a temperature of 75° C. (167° F.) to measure the service life. The number of cycles for battery cells having lead—tin—antimony alloy coated grids prepared in accordance with Example 3 was 47% higher at the last reading than the number of cycles for the control battery cells having uncoated grids prepared in accordance with Example 1. In addition, the battery cells of Example 3 continue on test as the lower voltage cutoff for the SAE J240 has not been reached. This demonstrates that batteries including grids made in accordance with the present invention will have better cycle life performance than batteries including conventional grids.

Thus, the present invention provides a method that can increase the adherence of battery active material to a battery grid produced by a continuous process, such as strip expansion, strip punching, or continuous casting. The method of the present invention increases the cycle life of a battery by enhancing the adhesion between the battery paste material and the battery grid. As a result, a battery manufacturer can take advantage of a low cost continuous grid making process without the drawbacks associated with inadequate paste adhesion.

Although the present invention has been described in considerable detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

What is claimed is:

1. A grid for a battery comprising:
   a plurality of wire elements, each wire element having opposed ends, each opposed end being joined to one of a plurality of nodes to define a plurality of open spaces; and
   a material comprising a lead alloy coated on substantially all surfaces of the wire elements;
   wherein at least one of the wire elements has a first transverse cross-section taken at a position intermediate the opposed ends of the wire element and a second transverse cross-section taken at one of the opposed ends of the wire element, the second transverse cross-section being generally rectangular and the first transverse cross-section being non-rectangular.

2. The grid of claim 1 wherein a first opposed end of the at least one wire element has a transverse cross-sectional shape that differs from a second opposed end of the at least one wire element.

3. The grid of claim 1 wherein the first transverse cross-section has a shape selected from the group consisting of diamond, oval, rhomboid, hexagon, and octagon.

4. The grid of claim 1 wherein the material comprising a lead alloy is porous.

5. The grid of claim 1 wherein the lead alloy comprises a lead-tin alloy.

6. The grid of claim 5 wherein the lead-tin alloy comprises about 90 weight percent to about 99 weight percent lead and about 1 weight percent to about 10 weight percent tin.

7. The grid of claim 6 wherein the lead-tin alloy further includes antimony.

8. The grid of claim 5 wherein the lead-tin alloy comprises about 80 weight percent to about 98 weight percent lead, about 1 weight percent to about 10 weight percent tin, and about 1 weight percent to about 10 weight percent antimony.

9. The grid of claim 8 wherein the material comprising a lead alloy has a melting point less than 620 degrees Fahrenheit.

10. The grid of claim 6 wherein the grid comprises a lead-calcium alloy.

11. The grid of claim 10 wherein the lead-calcium alloy comprises about 0.06 weight percent to about 0.07 weight percent calcium.

12. The grid of claim 11 wherein the lead-calcium alloy comprises at least 0.8 weight percent tin.

13. The grid of claim 12 wherein the lead-calcium alloy comprises about 1.2 weight percent to about 1.5 weight percent tin.

14. The grid of claim 13 wherein the lead-calcium alloy comprises tin in a ratio to calcium of greater than 12:1.

15. The grid of claim 14 wherein the lead-calcium alloy comprises from about 0 to about 0.02 weight percent silver.

16. A grid for a battery comprising:
    a plurality of wires having a plurality of surfaces, at least one of the wires having a substantially rectangular cross-section at a first location at an end of the wire and a non-rectangular cross-section at a second location;

a plurality of apertures provided between the plurality of wires; and a coating comprising a lead alloy provided on the plurality of surfaces of the plurality of wires;

wherein the coating is configured to couple an active material to the plurality of wires.

17. The grid of claim 16 wherein the plurality of wires include a plurality of planar surfaces.

18. The grid of claim 17 wherein the plurality of apertures are defined by surfaces that are transverse to the plurality of planar surfaces.

19. The grid of claim 18 wherein the coating is disposed on the surfaces that are transverse to the plurality of planar surfaces.

20. The grid of claim 16 wherein the lead alloy comprises a lead-tin alloy comprising about 90 weight percent to about 99 weight percent lead and about 1 weight percent to about 10 weight percent tin.

21. The grid of claim 20 wherein the lead-tin alloy further includes antimony.

22. The grid of claim 16 wherein the lead alloy comprises a lead-tin alloy comprising about 80 weight percent to about 98 weight percent lead, about 1 weight percent to about 10 weight percent tin, and about 1 weight percent to about 10 weight percent antimony.

23. The grid of claim 22 wherein the coating has a melting point less than 620 degrees Fahrenheit.

24. The grid of claim 22 wherein the grid includes a lug.

25. The grid of claim 22 wherein the active material comprises a paste.

26. The grid of claim 16 wherein the non-rectangular cross-section is one of a diamond, an oval, a rhomboid, a hexagon, and an octagon.

27. A grid for a battery comprising:

means for supporting an active material; and a layer of material provided over and substantially covering the means for supporting the active material;

wherein the means for supporting an active material includes at least one wire element having a generally rectangular cross-sectional shape at a first location at an end of the wire element and a non-rectangular cross-sectional shape at a second location.

28. The grid of claim 27 wherein the means for supporting the active material comprises a network bordered by at least one frame element.

29. The grid of claim 28 wherein the means for supporting the active material comprises a plurality of spaced apart wires having a plurality of surfaces.

30. The grid of claim 29 wherein the means for supporting the active material comprises a plurality of apertures between the plurality of spaced apart wires.

31. The grid of claim 30 wherein the layer of material comprises a lead alloy.

32. The grid of claim 31 wherein the plurality of spaced apart wires include a plurality of planar surfaces.

33. The grid of claim 32 wherein the plurality of apertures are defined by surfaces that are transverse to the plurality of planar surfaces.

34. The grid of claim 33 the layer of material is disposed on the surfaces that are transverse to the plurality of planar surfaces.

35. The grid of claim 27 wherein the layer of material comprises a lead-tin alloy comprising about 90 weight percent to about 99 weight percent lead and about 1 weight percent to about 10 weight percent tin.

36. The grid of claim 35 wherein the lead-tin alloy further includes antimony.

37. The grid of claim 31 wherein the layer of material comprises about 80 weight percent to about 98 weight percent lead, about 1 weight percent to about 10 weight percent tin, and about 1 weight percent to about 10 weight percent antimony.

38. The grid of claim 37 the layer of material has a melting point less than 620 degrees Fahrenheit.

* * * * *